United States Patent [19]
Robertson

[11] 3,984,140
[45] Oct. 5, 1976

[54] COLLAPSIBLE COUCH
[75] Inventor: Robert H. Robertson, Dallas, Tex.
[73] Assignee: Ronbil Industries, Inc., Mesquite, Tex.
[22] Filed: Jan. 27, 1975
[21] Appl. No.: 544,564

[52] U.S. Cl. ............................... 296/23 R; 5/12 R; 5/357; 296/24 R
[51] Int. Cl.² ............................................ B60P 3/38
[58] Field of Search ............... 296/69, 24 R, 23 R, 296/99, 37 R, 39 R, 1 F; 5/12, 357; 297/DIG. 2

[56]  References Cited
UNITED STATES PATENTS

| | | | |
|---|---|---|---|
| 1,995,143 | 3/1953 | Burch | 296/37 R |
| 3,179,469 | 4/1965 | Heuston | 297/DIG. 2 |
| 3,298,741 | 1/1967 | Lepard, Jr. et al. | 297/DIG. 2 |
| 3,751,103 | 8/1973 | Robertson | 296/39 R |
| 3,857,120 | 12/1974 | Acker | 5/12 R |

FOREIGN PATENTS OR APPLICATIONS

| 140,165 | 1/1935 | Austria | 5/12 R |
|---|---|---|---|

Primary Examiner—L. J. Paperner
Assistant Examiner—Donald W. Underwood
Attorney, Agent, or Firm—Richards, Harris and Medlock

[57]  ABSTRACT

The specification discloses a couch structure for installation in a plurality of different models and makes of pickup trucks. A pair of rigid side panels are connected together along the bottoms and backs thereof by a flexible sheet. The side panels engage the sides of the pickup bed and the flexible sheet extends across the pickup truck bed to form a couch frame. A rectangular back pillow is locked in position between the side panels and the front wall of the pickup bed. A pair of side pillows are positioned parallel to the side panels. A second rectangular back pillow is positioned parallel to the first back pillow and a pair of rectangular seat pillows are stacked flat on the floor of the pickup bed. The second back pillow and two bottom pillows may be spread out on the floor of the pickup bed to form a substantially continuous bed.

4 Claims, 6 Drawing Figures

COLLAPSIBLE COUCH

FIELD OF THE INVENTION

The present invention relates to collapsible couches, and more particularly, relates to an improved collapsible couch for installation in the bed of a pickup truck.

BACKGROUND OF THE INVENTION

It has become common to utilize camper covers, sometimes termed "pickup toppers", over the beds of conventional pickups. These covers provide an enclosed area in the bed of the truck which may be used as sleeping quarters, or the like, for travel and sporting excursions. Generally, the enclosed area within the camper cover is only partially finished and often includes only a mattress or bed disposed upon the bed of the pickup. It has heretofore been proposed to utilize a finished assembly incorporating a couch design for installation in the interior of a pickup bed, such as shown in U.S. Pat. No. 3,751,103.

Although these prior assemblies have served their purpose, it has become desirable to mass produce these assemblies so that they do not have to be custom manufactured to fit a particular pickup bed shape and size. In addition, it is desirable to design a couch which is strong, durable and will remain in position during movement of the truck.

SUMMARY OF THE INVENTION

In accordance with the present invention, an improved couch assembly is provided for installation in pickup truck beds of different sizes and shapes. The couch includes a pair of rigid side panels connected together by a webbing material and is provided with back and seat portions. The back and seat portions convert into a bed.

In accordance with a specific aspect of the present invention, an improved couch assembly is provided for installation in a pickup bed. The assembly has a pair of molded side panels for engaging the sides of a pickup bed. Storage, ice chests, or the like, may be located in the side panels. The side panels are connected together by a flexible material which lays on the floor and against the front wall of the pickup bed. A pair of side cushions are positioned parallel to the side panels and provide arm rests for the couch. A first back pillow is locked in position by the side panels against the front wall of the pickup bed. A pair of rectangular cushions are stacked on top of each other to form the seat portion of the couch and a second back cushion is positioned parallel to the first back cushion to form the back rest of the couch. The second back cushion and the two bottom cushions can be arranged along the length of the pickup bed to form a full size bed with a substantially continuous horizontal surface.

DESCRIPTION OF THE DRAWINGS

For a more complete understanding of the present invention and for further objects and advantages thereof, reference is now made to the following description taken in conjunction with the accompanying Drawings, in which.

DESCRIPTION OF THE PREFERRED EMBODIMENT

Figure 1:
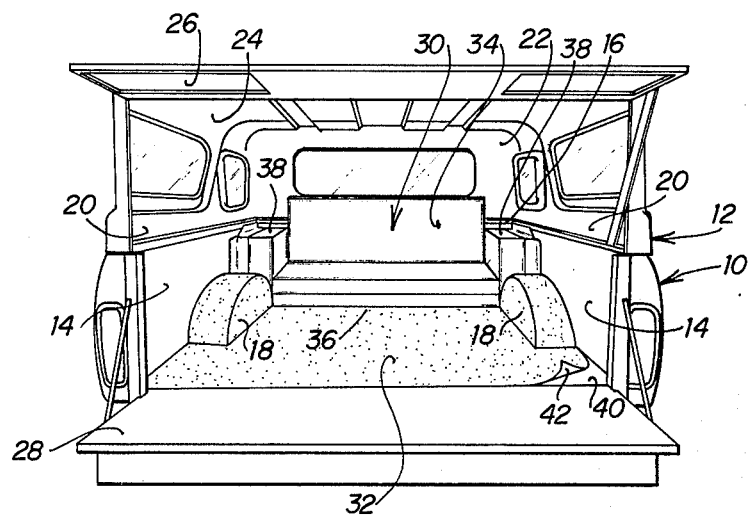
FIG. 1 illustrates a perspective view of the rear of a pickup having a camper cover thereon, with the improved couch of the present invention installed therein.

Referring now to the Drawings, wherein like reference characters designate like or corresponding parts throughout the several views, there is illustrated in FIG. 1, a pickup truck bed 10 with a camper cover 12 mounted thereon. The pickup truck bed 10 has a pair of side walls 14 and a front wall 16. Wheel wells 18 extend from the side walls to clear the rear wheels of the vehicle.

The cover 12 has windowed side wall 20 and a front wall 22, extending, respectively, from walls 14 and wall 16 of the bed 10. The cover 12 has a ceiling 24 and a rear door 26. Door 26 cooperates with the tailgate 28 of the bed 10 to provide access to the interior of the bed 10.

As is illustrated in FIG. 1, the improved couch 30 of the present invention is shown installed in the pickup bed 10. Couch 30 rests on the floor 32 of the bed 10 and leans against the wall 16. The couch 30 has back and seat portions 34 and 36, respectively. Cushions 38 form side arm rests.

As is shown in FIG. 1, the bed 10 can be prepared for the couch 30 by first installing a sub-floor liner 40 on the floor 32 of the pickup bed, and thereafter, installing a carpet 42 over the sub-floor. This carpet 42 can cover the wheel wells as is typically illustrated in U.S. Pat. No. 3,751,103. It is also envisioned that the couch of the present invention can be assembled without finishing the bed of the pickup.

Figure 2:
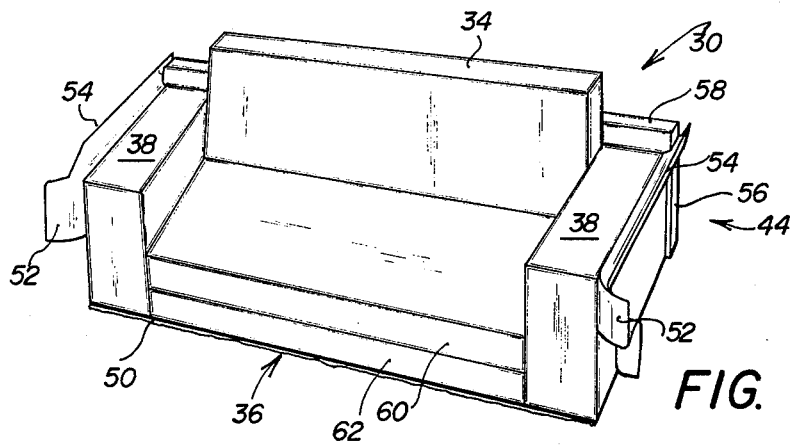
FIG. 2 is an enlarged perspective view of the improved couch assembly of the present invention.
Figure 3:
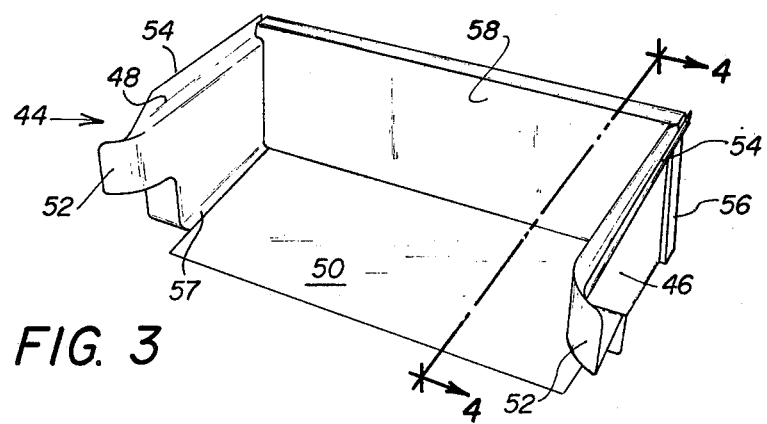
FIG. 3 is an enlarged perspective view of the side panel assembly of the couch of the present invention.
Figure 4:
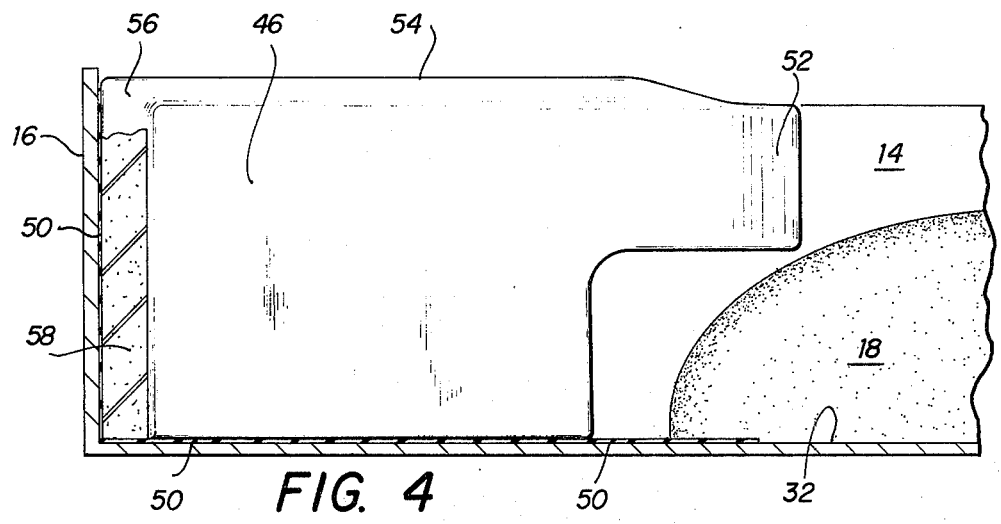
FIG. 4 illustrates a section of the device taken on line 4—4 of FIG. 3, looking in the direction of the arrows.

The couch 30 is assembled in the bed 10 by first installing the side panel assembly 44. The side panel assembly is illustrated in detail in FIGS. 3 and 4 as comprising right and left rigid side panels 46 and 48, respectively. Panels 46 and 48 are connected together by material 50. This material 50 is a flexible plastic sheet interconnecting the bottom and one side of the panels 46 and 48. The panels 46 and 48 are preferably formed from a sheet of molded plastic material. The righthand side panel 46, which is typical in construction, has a portion 52 extending out over the wheel well 18 to allow the panel to fit flush against the side of the pickup bed 10. A flange 54 extends from the panel 46 along the top edge thereof in a direction to contact the sides of the bed 10. A second depending flange portion 56 is provided along the edge opposite the extending portion 52 for receiving and retaining a first back cushion 58 in position flush against wall 16. As shown in FIGS. 1–3, back cushion 58 holds panels 46 and 48 in an upright position against the side walls of the pickup bed. Flanges 57 are located on the bottom of each end panel to enable connection by fasteners or welding to the edges of the sheet material 50.

If desired, the couch has arm rests formed from rectangular-shaped cushions 38. Cushions 38 are positioned adjacent to and parallel to side panels 46 and 48. Seat portion 36 is formed from two rectangular-shaped cushions 60 and 62 stacked in an adjacent parallel relationship. The back portion 34 is positioned to the front of the seat portion 36 and is held in position by the seat cushions 60 and 62. As shown in the Drawings, cushions 60 and 62 further assist in holding panels 46 and 48 against the side walls of the pickup bed.

The various cushions of the couch are constructed in a conventional manner from resilient material, such as upholstery foam and suitably covered with waterproof upholstery material.

It will be understood that the side panels 46 and 48, together with the flexible sheet material 50 form a frame for the couch of the invention. The sheet material 50 maintains the cushions out of contact with the floor and sides of the pickup bed, thereby keeping the cushions clean. Further the sheet material 50 keeps the side panels 46 and 48 from being pressed into the cavity of the pickup side walls, and therefore maintains the couch frame in a "squared configuration" at all times. The combination of the flexible sheet material 50 with the side panels 46 and 48 and the couch cushions then forms a substantially rigid couch, but enables the couch to be broken down and packaged in a relatively small container.

Figure 5:
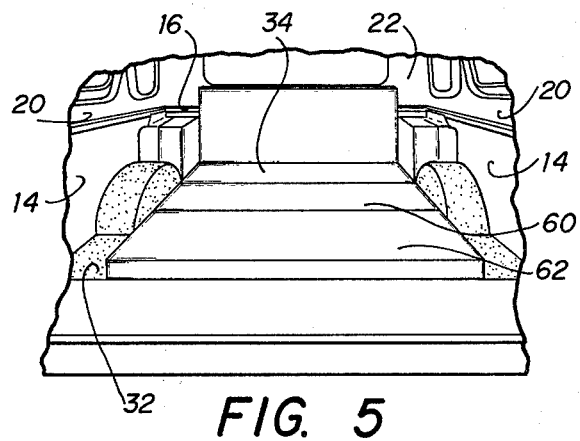
FIG. 5 is a perspective view similar to FIG. 1, illustrating the couch converted to a bed.

If it is desired to make a bed from the couch illustrated in FIGS. 1–4, the back cushion 34 is placed flush on the pickup bed as illustrated in FIG. 5, and the two bottom cushions 60 and 62 are placed side by side on the bed of the pickup as shown. Thus, a substantially continuous bed surface can be formed.

It is envisioned that the couch of the present invention could be utilized in a pickup bed without a finished floor covering with material 50 protecting the cushions from contact with the pickup bed. In addition, the material 50, in cooperation with panels 46 and 48, provides framing for the couch retaining it in a rigid upright position. If it is desired to provide for installation in a plurality of different widths of pickups, a plurality of different sizes and shapes of side panels can be provided. Material 50 may comprise a plastic sheet or a plurality of flexible straps.

Figure 6:
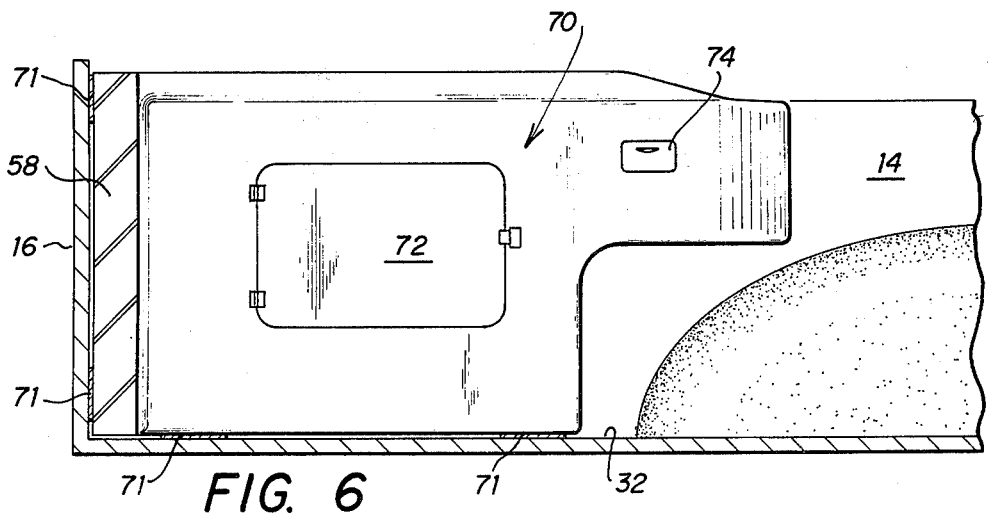
FIG. 6 is a view similar to FIG. 4 of an alternative embodiment of the side panels.

In FIG. 6, an alternate embodiment of the present invention is illustrated. In this embodiment, the side panels 70 are connected together by straps 71 spaced along the bottom on one side of the panels 70. Panel 70 has a door 72 formed therein. The door provides access to a utility storage box formed in the panel 70 and which can be insulated and used as an ice box, or the like, if desired. It is also envisioned that ask trays 74, radio, tape deck, or the like, could be mounted in the side of the panel 70 as desired. In this embodiment, side cushions are not required.

Whereas the present invention has been described in respect to specific embodiments thereof, it will be understood that various changes and modifications will be suggested to one skilled in the art, and it is intended to encompass said changes and modifications as fall within the scope of the appended claims.

I claim:

1. A couch assembly for installation in a pickup bed and adapted for conversion to a substantially flat bed on the floor of the pickup bed comprising:
   a pair of rigid side panels for abutting the sides of the pickup bed with one edge resting on the floor of the pickup bed and one edge adjacent the front wall of the pickup bed, said side panels each having a flanged portion defining a pocket along the front wall of the pickup bed;
   flexible sheet material interconnecting said panels, said sheet material extending across the width of the pickup bed and being attached to said panels along the one edge of each panel resting on the floor and the one edge of each panel adjacent to the front wall of the pickup bed;
   a first back rest cushion extending across the width of the pickup bed and contacting the sheet material along the front wall of the pickup bed and with the ends of said first cushion retained in said pockets;
   a pair of rectangular cross section arm rest cushions positioned parallel and adjacent to said side panels;
   a second rectangular cross section back rest cushion extending across the bed of the pickup between said arm rest cushions and adjacent to the first back rest cushion; and
   a seat portion formed from a pair of rectangular cross section cushions laying flush on the bed of the pickup and extending between the arm rest cushions, the combined width of said arm rest cushions and said seat portion being equal to the width of the pickup bed.

2. A couch assembly for installation in a pickup bed and adapted to convert to a bed comprising:
   a pair of rigid side panels abutting the sides of the pickup bed with one edge of said panels resting on the floor of the pickup bed and one edge adjacent the front wall of the pickup bed, wherein each of said side panels includes a flanged portion,
   flexible material contacting the floor of the pickup bed and attached at each end to said panels at the edge resting on the floor, said material extending across the width of the pickup bed between said side panels to form an integral couch frame within the pickup bed, said frame being operable to be folded to a small volume,
   a first back rest portion comprising a rectangular cross section resilient cushion positioned within said frame, wherein said first back rest portion extends across the bed of the pickup and is received and retained within said side panel flanged portions and lies adjacent said front wall of the pickup bed,
   a second back rest portion comprising a generally rectangular cross section resilient cushion extending across the bed of the pickup positioned and held within said frame and adjacent said first back rest portion, and
   a seat portion extending between said side panels, wherein said back rest and seat portions are held within said frame and interact with said side panels and said flexible material to maintain said side panels in position adjacent the sides of the pickup bed to form a couch.

3. A couch assembly for installation in a pickup bed and adapted to convert to a bed comprising:
   a pair of rigid side panels abutting the sides of the pickup bed with one edge of said panels resting on the floor of the pickup bed and one edge adjacent the front wall of the pickup bed,
   flexible material comprising a sheet contacting the floor of the pickup bed and attached at opposite ends to said side panels along said edges resting on the floor of the pickup bed and said material also extending in a vertical direction along and adjacent to said front wall and with said opposite edges being further attached to the edges of the side panels adjacent to the front wall of the pickup bed, said material extending across the width of the pickup bed between said side panels to form an integral couch frame within the pickup bed, said frame being operable to be folded to a small volume, a back rest portion extending across the bed of the pickup positioned and held within said frame and adjacent the front wall of the pickup bed, and a seat portion extending between said side panels, wherein said back rest and seat portions are held within said frame and interact with said side panels and said flexible material to maintain said side panels in position adjacent the sides of the pickup bed to form a couch.

4. A couch assembly for installation in a pickup bed and adapted to convert to a bed comprising:

a pair of rigid side panels abutting the sides of the pickup bed with one edge of said panels resting on the floor of the pickup bed and one edge adjacent the front wall of the pickup bed, flexible material comprising a plurality of straps, some of which contact the floor of the pickup bed and are attached at opposite ends to said one edge of said side panels resting on the floor and being longitudinally spaced along the edge resting on the floor of the pickup bed and some of which are attached at their opposite ends to the edges of said side panels adjacent to the front wall of the pickup bed and being vertically spaced along the edges of said side panels adjacent the front wall of the pickup bed, said material extending across the width of the pickup bed between said side panels to form an integral couch frame within the pickup bed, said frame being operable to be folded to a small volume, a back rest portion extending across the bed of the pickup positioned and held within said frame and adjacent the front wall of the pickup bed, and a seat portion extending between said side panels, wherein said back rest and seat portions are held within said frame and interact with said side panels and said flexible material to maintain said side panels in position adjacent the sides of the pickup bed to form a couch.

* * * * *